March 22, 1966 R. P. ROHDE 3,241,318
FLUID CONTROLS
Filed Sept. 28, 1964
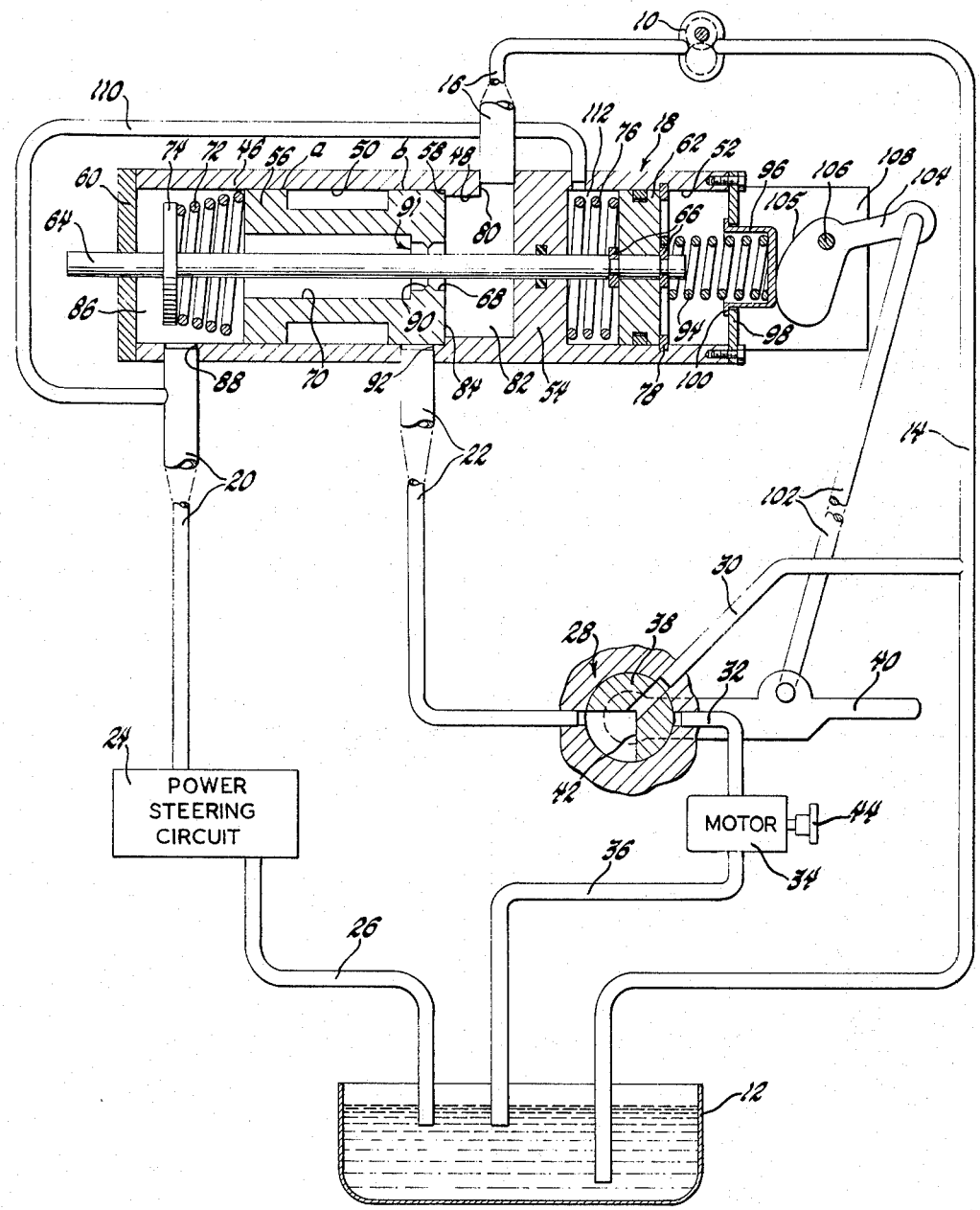
INVENTOR.
Robert P. Rohde
BY
ATTORNEY

United States Patent Office 3,241,318
Patented Mar. 22, 1966

3,241,318
FLUID CONTROLS
Robert P. Rohde, Saginaw, Mich., assignor to General Motors Corporation, Detroit, Mich., a corporation of Delaware
Filed Sept. 28, 1964, Ser. No. 399,677
11 Claims. (Cl. 60—52)

This invention relates to fluid controls and more particularly to flow divider valves for use in fluid systems to divide flow between a plurality of separate circuits in relation to their flow demands.

In fluid systems having a single fluid pressure supply source serving a plurality of separate circuits, one of which must have fluid available at all times, there is generally provided a flow divider which establishes distribution between the separate circuits and in favor of the one circuit to which fluid must be available at all times. Such a situation exists in the fluid system of a vehicle which has both a power steering circuit and an auxiliary power circuit operating intermittently an auxiliary power device such as for a fork lift. Heretofore the only fluid available to operate the auxiliary power device was generally that remaining after an established quantity of fluid has been diverted to the steering circuit and this was true whether or not the steering circuit was actually experiencing a steering operation requiring such quantity of flow. This set of circumstances resulted in undesirable slow auxiliary power device operation.

According to the present invention, there is provided a flow divider valve delivering discharge flow from a conventional power steering pump to the steering circuit. The flow divider valve includes a spring biased valve element which normally controls the establishment of a minimum flow rate to the steering circuit and the bypass of excess available flow back to the pump intake side or the delivery of the excess available flow to an auxiliary power circuit to operate an auxiliary power device. In this manner sufficient flow at a fixed priority is delivered to the steering circuit to satisfy power steering demands and all additional or excess flow is bypassed to the pump intake side or made available to the auxiliary power device.

The auxiliary power circuit is intermittently conditioned for operation and includes a selector valve operable to deliver the excess available flow from the flow divider valve to the pump intake side when the auxiliary power device is not being operated and when the latter is to be operated delivers such flow to the auxiliary power device.

Diversion by the flow divider valve of practically all available fluid supply to hasten auxiliary power device operation is provided by a motor assembly connected to control compression of the valve element biasing spring. Upon the selector valve being conditioned to deliver the excess available flow to the auxiliary power circuit, a force is transmitted through connecting control linkage to the motor assembly where it acts to relieve the compression and thus the biasing force of the valve element biasing spring which is restricting the availability of excess flow. Under these conditions, the flow divider valve then delivers less flow to the steering circuit and correspondingly more flow is diverted to the auxiliary power circuit for rapid auxiliary power device operation. Complete relaxation of the valve element biasing spring is prevented so that sufficient flow is always available to the steering circuit to build pressure during steering operations requiring greater flow.

In the event during auxiliary power device operation the steering circuit should demand fluid as indicated by steering circuit pressure build up, the normal fixed priority to the steering circuit is reestablished. This is accomplished by providing the motor assembly with a pressure reaction surface continuously exposed to power steering circuit pressure. It there occurs a pressure build up in the steering circuit of a preselected magnitude, this pressure acting on the pressure reaction surface is effective to condition the motor assembly to relieve its prior relaxation of the valve element biasing spring so that the normal fixed priority to the steering circuit is reestablished. Provided there is no flow demand by the steering circuit, the diversion in favor of the auxiliary power circuit continues until the selector valve is selected to again deliver the excess available flow to the pump intake side, movement of the selector valve acting through the control linkage also being effective to condition the motor assembly to relieve its prior relaxation of the valve element biasing spring.

It is an object of this invention to provide in a fluid system having a plurality of separate circuits including a primary circuit which must have fluid available to it at all times, a flow divider valve establishing a fixed priority on the fluid available from a single fluid pressure source to the primary circuit and bypassing any additional fluid for availability to an auxiliary circuit when the auxiliary circuit is in a nonoperating condition and being responsive to the conditioning of the auxiliary circuit for operation to divert a greater quantity of flow to the auxiliary circuit and less but sufficient flow to the primary circuit.

It is another object of this invention to provide in a fluid pressure system having a plurality of separate circuits one of which requires fluid at all times, a flow divider valve providing distribution of available fluid from a fluid pressure supply source between the one circuit and a second circuit to provide a fixed priority and sufficient flow to the one circuit for normal operation and bypassing any additional flow with such additional flow also being made available to the second circuit when the latter is not being operated for subsequent operation and further being operable when the second circuit is being operated to deliver less flow to the one circuit and correspondingly more flow to the second circuit and being responsive to the flow demands of the one circuit as experienced by fluid pressure build up in the one circuit to reestablish the fixed priority on flow to the one circuit.

It is another object of this invention to provide a flow divider valve receiving fluid from a variable fluid pressure and supply source and having a first outlet for connection to a first circuit which must have fluid available to it at all times and a second outlet for connection to a second circuit which has intermittent flow demands including a valve member movable against biasing means to control the distribution of fluid as between the outlets, the flow divider valve normally controlling to provide a fixed priority and sufficient flow to the first outlet for delivery to the first circuit and to divert any additional available flow to the second outlet for bypass flow when the second circuit is not requiring fluid and motor means controlling the valve member biasing means controlled by conditioning of the second circuit for operation to control the biasing force provided by the valve member biasing means to condition the flow divider valve to deliver more flow to the second circuit and less flow to the first circuit and the motor means being further responsive to a pressure build up in the first circuit or conditioning of the second circuit for nonoperation to relieve its control of the biasing means reestablishing the fixed priority upon the available flow to the first circuit.

These and other objects of the invention will be more apparent from the following description and drawing in which:

A schematic view of a fluid system including a crosssectional view of a flow divider valve according to the present invention is shown.

Referring to the drawing, the numeral 10 denotes a conventional constant displacement type pump which in the application of the system to an automotive vehicle may be assumed as being belt driven by the engine. Pump 10 draws on its intake side from a collecting sump 12 via an intake conduit 14 and delivers on its discharge side fluid under pressure via a discharge conduit 16 to a flow divider valve 18 which is a preferred form of the present invention. Flow divider valve 18, whose structure and mode of operation will be described in greater detail later, divides the pump discharge flow between a conduit 20 and a conduit 22.

Conduit 20 is connected to supply a power steering circuit 24 which exhausts by a conduit 26 to sump 12 and the power steering circuit may be assumed as having an "open-center" type control valve and power cylinder conforming to those shown in United States Patent 2,897,684 granted August 4, 1959, to Lincoln et al.

Conduit 22 is connectible by a selector valve 28 to ether a bypass conduit 30 connected to intake conduit 14 or to an auxiliary power circuit which includes a motor supply conduit 32 connected to supply an auxiliary power motor 34 which operates in response to fluid pressure supply and exhausts via an exhaust conduit 36 to sump 12. Selector valve 28 is of the rotatable type having a rotatable valve element 38 which is rotated through the operation of a connected selector lever 40 to connect via its valve passage 42 conduits 22 and 30 while blocking conduit 32 to conduit 22 as shown in the drawing and when rotated clockwise from the position shown in the drawing connects via its valve passage 42 conduits 22 and 32 while blocking conduit 30 to conduit 22. With conduit 32 opened to conduit 22 and conduit 30 blocked, fluid pressure delivered to auxiliary power motor 34 provides a power output at its power output shaft 44 to drive the vehicle's other power accessory equipment such as a fork lift.

The control valve of the power steering circuit 24 as shown in the identified patent preferably should continuously supply fluid to the power cylinder to provide the proper degree of assist at all times. The flow demands of the power steering circuit 24 are dependent on the degree of steering demanded by the operator varying from a minimum when the steering is not being used which is made available to build pressure upon steering demand up to a maximum flow range as occurs during parking or tight maneuvering when maximum steering resistance is encountered. These flow demands of the power steering circuit 24 on the flow available are proportional to resulting pressure build up in conduit 20 which is a supply conduit for this circuit, low pressures in conduit 20 requiring the least flow and higher pressures requiring greater flow. Generally, the only flow available for an auxiliary power device is that remaining after a fixed quantity has been diverted to the power steering circuit 24 and this is true whether or not the latter circuit is actually demanding flow in excess of its minimum flow requirements. Since the speed of operation of the auxiliary power device is dependent on the fluid available to it, its speed of operation when made dependent solely on the fixed priority of the power steering circuit is unduly limited when the power steering circuit does not actually demand such flow diversion in its favor. It has been found that if the power steering circuit is not being used and has a small flow demand, practically all the available fluid could be diverted to operate the auxiliary power device without adversely affecting the power steering circuit. The latter's speed of operation then could be substantially hastened provided further that if the steering circuit should demand fluid, its full quota of fluid supply could again be made available so that the steering demands will always be satisfied.

The flow divider valve 18 achieves this desired flow diversion and includes a valve body 46 having a bore 48, a counterbore 50 which is an enlargement of bore 48 and a bore 52 separated from bore 48 and counterbore 50 by a partition 54, all these bores being in axial alignment. A spool valve element 56 having equal diameter lands $a$ and $b$ is slidably mounted in counterbore 50 and abuttable with the counterbore step 58, the open end of counterbore 50 being closed by an end plate 60, and a control piston 62 provided with a suitable piston ring is slidably mounted in bore 52. A piston rod 64 firmly secured by snap rings 66 to piston 62 extends through an aperture in partition 54, a central aperture 68 and counterbore 70 in valve element 56 and is slidably supported at its left-hand end by end plate 60. Suitable seals are provided in partition 54 and end plate 60 to prevent fluid leakage past these points. A valve element biasing spring 72 arranged between the left-hand end of valve element 56 and a collar 74 integral with piston rod 64 urges separation of valve element 56 relative to the collar 74 when the piston rod 64 is held in the position shown in the drawing, spring 72 under these prestressed conditions holding valve element 56 against step 58.

A prestressed piston return spring 76 having a spring force greater than that of spring 72 normally urges piston 62 against a stop ring 78 retained in bore 52 to hold piston rod 64 in the position shown thereby providing a preselected compression of spring 72 when valve element 56 is in the position shown and also maintaining known compressions of spring 72 when valve element 56 is urged leftwardly by fluid pressure as will be described in detail later.

A valve inlet port 80 continuously connects the pump discharge conduit 16 with a chamber 82 exposing the right-hand end surface 84 of the valve element 56 and a chamber 86 exposing the left-hand end of valve element 56 has a primary valve outlet port 88 connected to conduit 20. In aperture 68 there is provided an annular projection 90 circumjacent to and in clearance with piston rod 64 which in cooperation with the surface of piston rod 64 provides a flow control orifice generally designated at 91 connecting chamber 82 with counterbore 70 and connected chamber 86.

OPERATION

With pump 10 in operation, fluid under pressure is delivered to chamber 82, passes through flow control orifice 91 and thence to chamber 86 and then through the primary valve outlet port 88 to conduit 20 to supply the power steering circuit 24. When the flow through flow control orifice 91 is sufficient to satisfy predetermined minimum power steering circuit flow requirements the resulting pressure drop across this orifice produces a pressure differential between chambers 82 and 86 to the extent that the spring bias of spring 72 acting on valve element 56 is overcome. Valve element 56 then moves leftwardly so that land $b$ gradually opens an auxiliary or secondary outlet port 92 and connected conduit 22 to chamber 82.

With valve 28 conditioned as shown in the drawing to connect conduit 22 to bypass conduit 30, the excess fluid being delivered to chamber 82 over that required to satisfy the requirements of the flow control orifice 91 is bypassed to the pump intake side to prevent undesirable heat build up in the power steering circuit 24 resulting from excessive flow to this circuit. This bypass flow is utilized to provide a supercharging effect on the pump intake side for preventing flow cavitation at this point thus serving a useful purpose. As pump speed and discharge pressure continues to increase and with the power steering circuit pressure remaining substantially constant, the valve element 56 will move further leftward until eventually the secondary valve outlet port 92 is fully opened by land $b$ to chamber 82 for maximum bypass flow in the higher pump speed ranges, land $a$ continuing to leave the primary valve outlet port 88 unblocked up to this point. The bypass flow permitted in the higher pump speed ranges by the full uncovering of the secondary valve outlet port 92 is made adequate to limit pump discharge pressure build up in chamber 82 and therefore pressure communicated to the power steering circuit to a predetermined maximum safe pressure range.

With the structure thus far described should valve 28 be conditioned to connect conduit 22 to conduit 32 for operation of motor 34, the flow available for operation of the latter is that remaining over after the fixed priority flow in favor of the power steering circuit 24 has been satisfied even though the power steering circuit is not actually requiring such fixed priority on available flow. To hasten operation of auxiliary power motor 34 provided that the power steering circuit 24 is not requiring flow to satisfy a steering demand the compression of spring 72 is controlled in the manner to be described to enable valve element 56 to move leftwardly so that land b uncovers the secondary valve outlet port 92 when the pressure differential between chambers 82 and 86 falls within a pressure range lower than that previously described to initiate bypass flow to the pump intake side.

For this purpose, there is provided a control spring 94 having a spring force greater than return spring 76 arranged between piston 62 and a retainer cap 96 which is slidably supported in an aperture in an end plate 98 firmly secured to the right-hand end of valve body 46. Cap 96 is normally held in the position shown by the control spring 94 which is its maximum extended position as determined by its annular shoulder 100 abutting plate 98. A rigid linkage member 102 is pivotally connected at spaced points along its length to selector valve lever 40 and a lever 104 having a cam surface 105 engaging the extended end of cap 96, lever 104 being pivoted by a pin 106 on a support bracket 108 integral with end plate 98.

It will be considered now that the flow divider valve 18 is functioning as described previously with any excess fluid available over that required to satisfy orifice 91 being bypassed to the pump intake side, such excess flow also being available for subsequent auxiliary power device operation, and that the selector valve 28 is then conditioned by clockwise rotation of lever 40 from the position shown to connect conduit 22 to conduit 32 while at the same time blocking conduit 30 to conduit 22. As lever 40 is pivoted clockwise, linkage member 102 pivots lever 104 clockwise causing the cam surface 105 to urge cap 96 leftwardly. As cap 96 moves leftwardly, the lever force provided by lever 104 acting through control spring 94 overcomes the spring bias of spring 76 pushing piston 62 and connected piston rod 64 leftwardly. As piston rod 64 moves leftwardly, the collar 74 being integral with piston rod 64 moves conjointly therewith and the compression of spring 72 is relaxed.

With the compression of spring 72 relaxed, the previously existing pressure differential between chambers 82 and 86 acts on valve element 56 urging the latter to move leftwardly to a greater extent than prior to relaxation of spring 72 thereby either initially opening by land b the secondary valve outlet port 92 to chamber 82 or after it has already been partially opened, opening the latter wider and in addition partially closing by land a the primary valve outlet port 88 upon sufficient leftward movement. Under these conditions less flow is then through the primary valve outlet port 88 and correspondingly more flow is directed to the secondary valve outlet port 92 and connected conduit 22 for operation of the auxiliary power motor 34.

Sufficient flow must pass through primary valve outlet port 88 to the power steering circuit 24 to enable pressure build up in this circuit for signaling flow demand. This flow would be completely blocked if piston rod 64 is permitted to move too far to the left so that spring 72 is completely relaxed. For this purpose collar 74 is arranged relative to the end plate 60 so that collar 74 bottoms out on end plate 60 prior to complete relaxation of spring 72, the control spring 94 providing a lost motion connection when necessary between piston 62 and cap 96 upon such bottoming out of collar 74.

If during auxiliary power device operation the power steering circuit 24 should demand its full quota of fluid, such demand will be signaled by pressure build up in conduit 20. This pressure build up is transmitted from conduit 20 through a signal conduit 110 to a chamber 112 to act on the left-hand face of piston 62. This pressure build up when reaching a selected pressure range determinative of full quota demand by the power steering circuit acting on piston 62 forces the piston 62 and connected piston 64 rightwardly against control spring 94 until piston 62 is returned to abut with stop ring 78. Under these conditions, the fluid flow to conduit 20 will then again equal the fixed priority in favor of the power steering circuit 24 during its demand on flow and while the auxiliary power device motor continues to operate. Upon this power steering circuit flow demand being relieved, the resulting decrease in pressure in chamber 112 will permit control spring 94 to urge piston 62 and connected piston rod 64 leftwardly to again provide more flow to conduit 22 and less flow to conduit 20 as before.

So long as there is no pressure build up in conduit 20 up to the selected pressure range to operate piston 62 the diversion of flow by the flow divider valve 18 favoring conduit 22 to supply the auxiliary power circuit continues until the selector valve lever 40 is pivoted counterclockwise to the position shown, such movement also pivoting the lever 104 counterclockwise so as to permit return of piston 62 against stop ring 78 by the return spring 76.

The above-described preferred embodiment is illustrative of the invention and it is to be understood that it can be modified within the scope of the appended claims.

I claim:
1. In a flow divider valve the combination of
   (a) valve means including a valve inlet, a plurality of valve outlets and valve biasing means operable to deliver all available flow from said valve inlet to one valve outlet in a selected flow range and said valve biasing means at increasing fluid flow and pressure at said valve inlet enabling said valve means to deliver to another valve outlet any available flow in excess of that required to maintain a selected minimum flow rate to said one outlet,
   (b) selector control means operatively connected to said valve biasing means operable to selectively control said valve biasing means so that said valve means delivers substantially all available flow from said valve inlet to said another outlet,
   (c) and pressure control means responsive to fluid pressure at said one valve outlet reaching a selected pressure range to release the control of said selector control means over said valve biasing means.

2. In a flow divider valve the combination of
   (a) flow divider valve means including an inlet port, a pair of outlet ports and valve biasing means operable to deliver all available flow from said inlet port only to one outlet port in a low flow and pressure range and said valve biasing means when normally prestressed enabling said flow divider valve means in a high flow and pressure range to deliver any available flow from said valve inlet port to the other outlet port in excess of that required to maintain a selected minimum flow rate to said one outlet port,
   (b) and motor means normally holding said valve biasing means normally prestressed and having selector control means selectively operable to partially relax said valve biasing means to permit said flow divider valve means to deliver substantially all available flow to said other outlet port, said motor means further including pressure control means responsive to fluid pressure at said one outlet port reaching a selected pressure range to restore said valve biasing means to its normal prestressed condition.

3. In a flow divider valve the combination of (a) a valve having an inlet port, first and second outlet ports and a valve member operable to open and close said second outlet port to said inlet port, said valve member having passage means continuously connected to said inlet port and being operable to open and partially close said first outlet port to said passage means and valve biasing spring means when normally prestressed to a selected degree urging said valve member to close said second outlet port to said inlet port in a selected fluid supply range to said inlet port, said valve member being responsive to increasing fluid supply above said selected fluid supply range to gradually open said second outlet port to said inlet port to deliver fluid from said inlet port to said second outlet port in excess of that required to maintain a selected minimum flow rate through said passage means to said first outlet port, (b) and motor means including piston means normally maintaining said valve biasing spring means normally prestressed to said selected degree, operating means selectively controllable to urge said piston means in a direction to partially relax said valve biasing spring means to enable said valve member to open said second outlet port to said inlet port at flow rates to said first outlet port below said minimum flow rate and to enable said valve member to open wider said second outlet port to said inlet port with increasing fluid supply to said inlet port and to eventually fully open said second outlet port to said inlet port and partially close said first outlet port to said passage means so that substantially all available flow supply is to said second outlet port and said piston means being responsive to a selected pressure build up at said first outlet port to be returned in the opposite direction to relieve partial relaxation of said valve biasing spring means.

4. In a flow divider valve the combination of
(a) a valve and motor body having a valve cylinder and a motor chamber having a motor cylinder, an inlet port, a first outlet port, a second outlet port, all of said ports being ported to said valve cylinder, said motor chamber being connected to said first outlet port, a valve stop and said first and second piston stops, (b) a valve member slidably mounted in said valve cylinder operable to open and close said second outlet port to said inlet port, a flow control orifice normally connecting said inlet port to said first outlet port, said valve member being operable to partially close said first outlet port to said flow control orifice, (c) piston means slidably mounted in said motor cylinder responsive to fluid pressure in said motor chamber to be urged in one direction, a piston return spring normally yieldingly holding said piston means against said first piston stop and resisting piston movement in a direction opposite said one direction, a valve biasing spring having a spring force smaller than said piston return spring arranged between piston means and said valve member, said valve biasing spring being prestressed to a selected degree determined by said valve member abutting said valve stop when said piston means is held against said first piston stop, (d) said valve member when abutting said valve stop closing said second outlet port to said inlet port and fully opening said first outlet port to said flow control orifice and being responsive to pressure drop across said flow control orifice in a selected flow rate range through said flow control orifice to gradually open said second outlet port to said inlet port with increasing fluid supply to said inlet port to deliver the excess fluid supply from said inlet port to said second outlet port while maintaining said first outlet port fully open to said flow control orifice, (e) operating means to control said valve biasing means including a piston control spring having a spring force greater than that of said piston return spring selectively controllable to urge said piston means in said opposite direction to abut with said second piston stop to partially relax said valve biasing spring to enable said valve member to initially open said second outlet port to said inlet port at flow rates through said flow control orifice below said selected flow rate range and to enable said valve member to open wider said second outlet port to said inlet port with increasing fluid supply to said inlet port and to eventually fully open said second outlet port to said inlet port and partially close said first outlet port to said flow control orifice, (f) and said piston means being responsive to a selected pressure build up in said motor chamber communicated from said first outlet port to be returned against the spring force of said piston control spring to said first piston stop to relieve the relaxation of said valve biasing spring.

5. In a flow divider valve the combination of
(a) a valve and motor body having a valve cylinder and a motor chamber having a motor cylinder, an inlet port, a first outlet port, a second outlet port, all of said ports being ported to said valve cylinder, said motor chamber being connected to said first outlet port, a valve stop and first and second piston stops, (b) a valve member slidably mounted in said valve cylinder operable to open and close said second outlet port to said inlet port, said valve member having a central aperture open to said inlet port and being operable to open and partially close said first outlet port to said central aperture, (c) a piston slidably mounted in said motor cylinder responsive to fluid pressure in said motor chamber to be urged in one direction and having a piston rod arranged to extend freely through said central aperture of said valve member, a piston return spring normally yieldingly holding said piston against said first piston stop and resisting piston movement in a direction opposite said one direction, said piston rod having a shoulder, a valve biasing spring having a spring force smaller than said piston return spring arranged between said shoulder and said valve member, said valve biasing spring being prestressed to a selected degree determined by said valve member abutting said valve stop when said piston is held against said first piston stop, (d) said piston rod having a constant selected clearance with said valve member in said central aperture during valve member movement to provide a flow control orifice between said inlet port and said first outlet port, said valve member when abutting said valve stop closing said second outlet port to said inlet port and fully opening said first outlet port to said flow control orifice and being responsive to the pressure drop across said flow control orifice in a selected flow rate range through said flow control orifice to said first outlet port to gradually open said second outlet port to said inlet port with increasing fluid supply to said inlet port to deliver the excess fluid supply from said inlet port through said second outlet port while maintaining said first outlet port fully open to said fluid control orifice, (e) a piston control spring having a spring force greater than that of said piston return spring selectively operable to urge said piston in said opposite direction until said piston rod abuts said second piston stop to partially relax the compression of said valve biasing spring to enable said valve member to open said second outlet port to said inlet port at flow rates through said flow control orifice below said selected flow rate range and to enable said valve member to open wider said second outlet port to said inlet port with increasing fluid supply to said inlet port and to eventually fully open said second outlet port to said inlet port and partially close said first outlet port to said flow control orifice, (f) and said piston being responsive to a selected pressure build up in said motor chamber communicated from said first outlet port to be returned against the spring force to said piston control spring to said first piston stop to relieve the relaxation of compression of said valve biasing spring established by movement of said piston in said opposite direction from said first piston stop.

6. In a flow divider valve the combination of (a) a valve and motor body having a valve cylinder and a motor chamber having a motor cylinder, an inlet port for connection to a variable fluid pressure and supply source, a first outlet port for connection to a first power circuit, a second outlet port for connection to a second power circuit and a bypass circuit, all of said ports being ported to said valve cylinder, said motor chamber being connected to said first outlet port, a valve stop and first and second piston stops, (b) a valve member slidably mounted in said valve cylinder operable to open and close said second outlet port to said inlet port, said valve member having a central aperture open to said inlet port and being operable to open and close said first outlet port to said central aperture, (c) a piston slidably mounted in said motor cylinder responsive to fluid pressure in said motor chamber to be urged in one direction and having a piston rod arranged to extend freely through said central aperture of said valve member, a piston return spring normally yieldingly holding said piston against said first piston stop and resisting piston movement in a direction opposite said one direction, said piston rod having a shoulder, a valve biasing spring having a spring force smaller than that of said piston return spring arranged between said shoulder and said valve member, said valve biasing spring being prestressed to a selected degree determined by said valve member abutting said valve stop when said piston is held against said first piston stop, (d) said piston rod having a constant selected clearence with said valve member in said central aperture during valve member movement to provide a flow control orifice between said inlet port and said first outlet port, said valve member when abutting said valve stop closing said second outlet port to said inlet port and fully opening said first outlet port to said flow control orifice and being responsive to the pressure drop across said flow control orifice in a selected flow rate range through said flow control orifice to said first outlet port to gradually open said second outlet port to said inlet port with increasing fluid supply to said inlet port to deliver the excess fluid supply from said inlet port through said second outlet port while maintaining said first outlet port fully open to said flow control orifice, (e) a selector valve operable to selectively connect said second outlet port to the bypass circuit and the second power circuit, (f) linkage means operatively linking said selector valve to said piston including a piston control spring having a spring force greater than that of said piston return spring controlled by operation of said selector valve to urge said piston in said opposite directon and said piston rod against said second piston stop when said selector valve is selected to connect said second outlet port to the second power circuit to partially relax the compression of said valve biasing spring to enable said valve member to open said second outlet port to said inlet port at flow dates through said flow control orifice below said selected flow rate range and to enable said valve member to open wider said second outlet port to said inlet port with increasing fluid supply to said inlet port and to eventually fully open said second outlet port to said inlet port and partially close said first outlet port to said flow control orifice, (g) and said piston being responsive to a selected pressure build up in said motor chamber communicated from said first outlet port to be returned against the spring force of said piston control spring to said first piston stop to relieve the relaxation of compression of said valve biasing spring established by movement of said piston in said opposite direction from said first piston stop.

7. In combination with a constant displacement type pump operating at varying speeds and receiving fluid on a pump intake side and discharging the fluid under pressure on a pump discharge side for delivery to a plurality of power circuits, (a) flow divider valve means normally operable to deliver all available fluid discharge from the pump discharge side to one of the power circuits in a low pump discharge flow range and in a higher pump discharge flow range to maintain a flow rate to said one power circuit within a selected flow rate range and to make available any excess available pump discharge flow for delivery to the pump intake side and another power circuit, (b) a selector valve operable to selectively deliver the excess available pump discharge flow from said flow divider valve means to the pump intake side and to said another power circuit, (c) and motor means operated by said selector valve and operatively connected to said flow divider valve means operable when said selector valve is operated to deliver pump discharge flow to said another power circuit to condition said flow divider valve means to deliver pump discharge flow to both said one and another power circuits when said pump discharge flow is in said low pump discharge flow range and to deliver substantially all pump discharge flow to said another power circuit as pump discharge flow increases through said higher pump discharge flow range.

8. In combination with a constant displacement type pump operating at varying speeds and receiving fluid on a pump intake side and discharging the fluid under pressure on a pump discharge side for delivery to a plurality of fluid circuits, (a) flow divider valve means including valve biasing means operable in a normal condition to deliver all available fluid discharge from the pump discharge side to one of the fluid circuits in a selected pump discharge flow and pressure range and said valve biasing means enabling said flow divider valve means when pump discharge flow and pressure increases past said selected range to make available pump discharge flow in excess of that required to maintain a selected minimum flow rate to said one fluid circuit for delivery to the pump intake side and also to another fluid circuit, (b) a selector valve operable in a first selector valve condition to deliver the excess available pump discharge flow from said flow divider valve means to the pump intake side and in a second selector valve condition to said another fluid circuit, (c) and motor means operatively connected to said valve biasing means controlled by fluid pressure in said one fluid circuit and conditioning of said selector valve operable when the fluid pressure in said one fluid circuit is below a selected pressure range and said selector valve is conditioned from said first selector valve condition to said second selector valve condition to control said valve biasing means so that said flow divider valve means deliver substantially all pump discharge flow to said another fluid circuit and is reconditioned to said normal condition whenever the fluid pressure in said one fluid circuit reaches said selected pressure range and also when said selector valve is reconditioned for said first selector valve condition.

9. In combination with a constant displacement type pump operating at varying speeds and receiving fluid on a pump intake side and discharging the fluid under pressure on a pump discharge side for delivery to a plurality of power circuits,
   (a) flow divider valve means operable in a first flow divider valve condition to deliver all available fluid discharge from the pump discharge side to one of the power circuits in a low pump discharge flow range and in a higher pump discharge flow range to maintain a flow rate to said one power circuit within a selected flow rate range and to make available any excess available pump discharge flow for delivery to the pump intake side and another power circuit,
   (b) a selector valve operable to deliver the excess available pump discharge flow from said flow divider valve means to the pump intake side in a first selector valve condition and to said another power circuit in a second selector valve condition,
   (c) and motor means controlled by fluid pressure in said one power circuit and conditioning of said selector valve operable when said selector valve is conditioned from said first selector valve condition to said second selector valve condition to condition said flow divider valve means for a second flow divider valve condition to deliver pump discharge flow to both said one and another power circuits when said pump discharge flow is in said flow pump discharge flow range and the fluid pressure in said one power circuit is below a selected pressure range and to deliver less pump discharge flow to said one power circuit and correspondingly more pump discharge flow to said another power circuit as pump discharge flow increases through said higher pump discharge flow range so long as the fluid pressure in said one power circuit remains below said selected pressure range and to recondition said flow divider valve means to said first flow divider valve condition whenever the fluid pressure in said one power circuit reaches said selected pressure range and when said selector valve is reconditioned for said first selector valve condition.

10. In combination with a constant displacement type pump operating at varying speeds and receiving fluid on a pump intake side and discharging the fluid under pressure on a pump discharge side for delivery to a plurality of power circuits and a bypass circuit connected to the pump intake side,
   (a) flow divider valve means including a valve and motor body having a valve cylinder and a motor chamber having a motor cylinder, an inlet port for connection to the pump discharge side, a first outlet port for connection to one of the power circuits, a second outlet port for connection to a second power circuit and the bypass circuit, all of said ports being ported to said valve cylinder, said motor chamber being connected to said first outlet port, a first stop and first and second piston stops,
   (b) a valve member slidably mounted in said valve cylinder operable to open and close said second outlet port to said inlet port, a flow control orifice normally connecting said inlet port to said first outlet port, said valve member being operable to partially close said first outlet port to said flow control orifice,
   (c) piston means slidably mounted in said motor cylinder responsive to fluid pressure in said motor chamber to be urged in one direction, a piston return spring normally yieldingly holding said piston means against said first piston stop and resisting piston movement in a direction opposite said one direction, a valve biasing spring having a spring force smaller than that of said piston return spring arranged between said piston means and said valve member, said valve biasing spring being prestressed to a preselected degree determined by said valve member abutting said valve stop when said piston means is held against said first piston stop,
   (d) said valve member when abutting said valve stop closing said second outlet port to said inlet port and fully opening said first outlet port to said flow control orifice and being responsive to the pressure drop across said flow control orifice in a selected flow rate range through said flow control orifice to gradually open said second outlet port to said inlet port with increasing fluid supply to said inlet port to deliver the excess fluid supply from said inlet port to said second outlet port while maintaining said first outlet port fully open to said flow control orifice,
   (e) a selector valve operable to selectively connect said outlet port to the bypass circuit and the second power circuit,
   (f) linkage means operatively linking said selector valve to said piston means including a piston control spring having a spring force greater than that of said piston return spring controlled by operation of said selector valve to urge said piston means in said opposite direction against said second piston stop when said selector valve is selected to connect said second outlet port to the second power circuit to partially relax the compression of said valve biasing spring to enable said valve member to partially open said second outlet port to said inlet port at flow rates through said flow control orifice below said selected flow rate range and to enable said valve member to open wider said second outlet port to said inlet port with increasing fluid supply to said inlet port and to eventually fully open said second outlet port to said inlet port and partially close said first outlet port to said flow control orifice so that substantially all fluid supply is delivered to the second power circuit,
   (g) and said piston means being responsive to a selected pressure build up in said motor chamber communicated from said first outlet port and connected first power circuit to be returned against the spring force of said piston control spring to said first piston stop to relieve the partial relaxation of said valve biasing spring.

11. In combination with a constant displacement type pump operating at varying speeds and receiving fluid on a pump intake side and discharging the fluid under pressure on a pump discharge side for delivery to a plurality of power circuits and a bypass circuit connected to the pump intake side,
   (a) flow divider valve means including a valve and motor body having a valve cylinder and a motor chamber having a motor cylinder, an inlet port for connection to the pump discharge side, a first outlet port for connection to one of the power circuits, a second outlet port for connection to a second power circuit and the bypass circuit, all of said ports being ported to said valve cylinder, said motor chamber being connected to said first outlet port, a first stop and first and second piston stops,
   (b) a valve member slidably mounted in said valve cylinder operable to open and close said second outlet port to said inlet port, said valve member having a central aperture open to said inlet port and being operable to open and partially close said first outlet port to said central aperture,
   (c) a piston slidably mounted in said motor cylinder responsive to fluid pressure in said motor chamber to be urged in one direction and having a piston rod arranged to extend freely through said central aperture of said valve member, a piston return spring normally yieldingly holding said piston against said first piston stop and resisting piston movement in a direction opposite said one direction, said piston rod having a shoulder, a valve biasing spring having a spring force smaller than that of said piston return spring arranged between said shoulder and said valve member, said valve biasing spring being prestressed to a preselected degree determined by said valve member abutting said valve stop when said piston is held against said first piston stop, (d) said piston rod having a constant selected clearance with said valve member in said central aperture during valve member movement to provide a flow control orifice between said inlet port and said first outlet port, said valve member when abutting said valve stop closing said second outlet port to said inlet port and fully opening said first outlet port to said flow control orifice and being responsive to the pressure drop across said flow control orifice in a selected flow rate range through said flow control orifice to gradually open said second outlet port to said inlet port with increasing fluid supply to said inlet port to deliver the excess fluid supply from said inlet port to said second outlet port while maintaining said first outlet port fully open to said flow control orifice, (e) a selector valve operable to selectively connect said outlet port to the bypass circuit and the second power circuit, (f) linkage means operatively linking said selector valve to said piston including a piston control spring having a spring force greater than that of said piston return spring controlled by operation of said selector valve to urge said piston in said opposite direction until said piston rod abuts said second piston stop when said selector valve is selected to connect said second outlet port to the second power circuit to partially relax the prestressing of said valve biasing spring to enable said valve member to open said second outlet port to said inlet port at flow rates through said flow control orifice below said selected flow rate range and to enable said valve member to open wider said second outlet port to said inlet port with increasing fluid supply to said inlet port and to eventually fully open said second outlet port to said inlet port and partially close said first outlet port to said flow control orifice, (g) and said piston being responsive to a selected pressure build up in said motor chamber communicated from said first outlet port to be returned against the spring force of said piston control spring to said first piston stop to relieve the partial relaxation of said valve biasing spring.

References Cited by the Examiner

UNITED STATES PATENTS

| | | | |
|---|---|---|---|
| 2,737,196 | 3/1956 | Eames | 60—52 X |
| 2,846,850 | 8/1958 | Hall | 60—525 X |
| 2,859,762 | 11/1958 | Banker | 60—525 X |
| 3,033,221 | 5/1962 | Strader | 60—525 X |
| 3,125,110 | 3/1964 | Allen et al. | 137—101 |

EDGAR W. GEOGHEGAN, *Primary Examiner.*